Nov. 22, 1966   O. JENSEN ETAL   3,287,679
GAS INSULATED CURRENT TRANSFORMER
Filed April 13, 1965   2 Sheets-Sheet 1
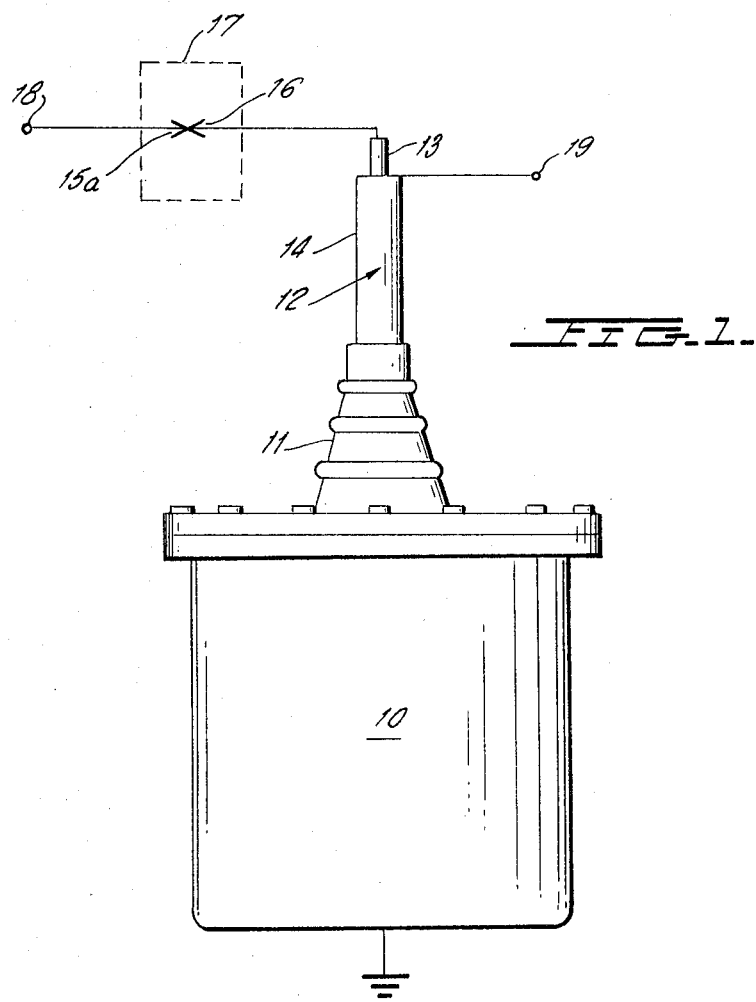
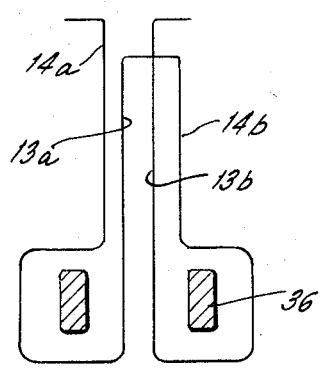
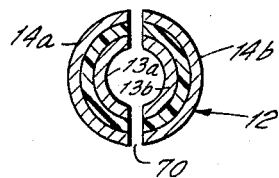
INVENTORS
OTTO JENSEN
AMADO CONANGLA
BY
OSTROLENK, FABER, GERB, & SOFFEN
ATTORNEYS Nov. 22, 1966  O. JENSEN ETAL  3,287,679
GAS INSULATED CURRENT TRANSFORMER
Filed April 13, 1965  2 Sheets-Sheet 2
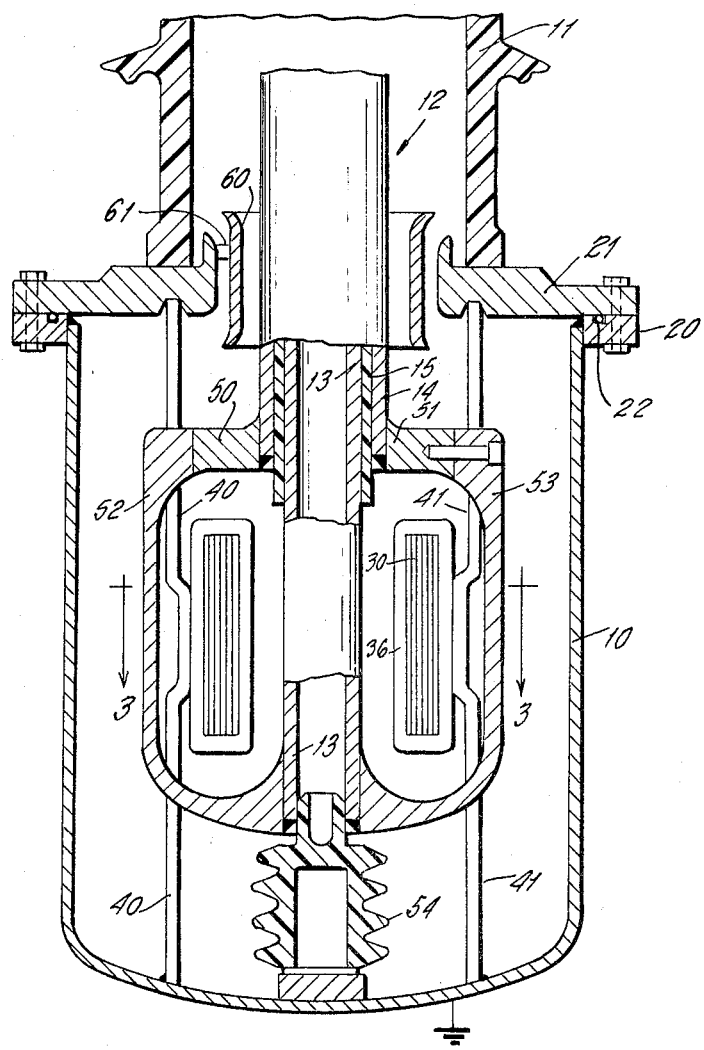
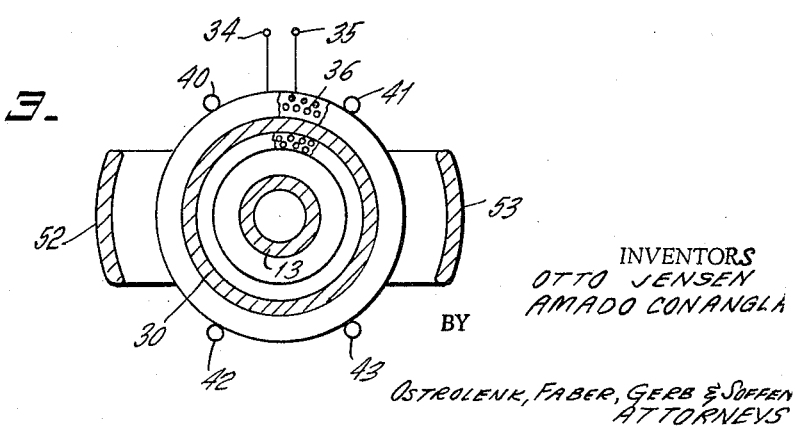
INVENTORS
OTTO JENSEN
AMADO CONANGLA
BY
OSTROLENK, FABER, GERB & SOFFEN
ATTORNEYS

United States Patent Office 3,287,679
Patented Nov. 22, 1966

3,287,679
GAS INSULATED CURRENT TRANSFORMER
Otto Jensen, Malvern, and Amado Conangla, Devon, Pa., assignors to I-T-E Circuit Breaker Company, Philadelphia, Pa., a corporation of Pennsylvania
Filed Apr. 13, 1965, Ser. No. 447,633
2 Claims. (Cl. 336—174)

This invention relates to a current transformer construction, and more specifically relates to a gas insulated current measuring transformer for use in high voltage circuits and which is contained within a grounded tank.

Current transformers for use in high voltage circuits are well known to the art. A major problem exists in providing current transformers for ungrounded high voltage interrupters wherein the complete interrupter assembly must be supported by suitable insulation means with respect to ground. Such arrangements are known as "live tank" arrangements, and require a separate insulated support for the current transformer, since the secondary current transformer leads must be brought to ground potential.

The present invention provides a novel grounded current transformer tank arrangement which permits the use of components having reduced dimensions, simpler construction, improved dielectric strength and improved support of the component parts. More particularly, and in accordance with the invention, the primary leads for the current transformer are formed of a pair of coaxially arranged tubular conductors insulated with respect to one another, and which enter the grounded tank of the invention through a sealed lead bushing. The central conductor of the coaxially arranged primary conductors then passes through the center of a secondary winding toroidally wound on a suitable core, while the outer conductor of the coaxially arranged conductors encircles the outer surface of the toroidally wound secondary winding. The two coaxial conductors are then joined at their bottom, thereby to form a single turn primary winding for the current transformer and are supported with respect to the grounded tank by a suitable stand-off bushing.

The interior of the tank is then filled with a suitable insulation gas having a high dielectric strength such as sulphur hexafluoride, under pressure. This permits the use of reduced clearances and results in smaller overall dimensions for the assemblage.

Accordingly, a primary object of this invention is to provide a novel gas insulated current measuring transformer for use in high voltage circuits.

Another object of this invention is to provide a novel grounded tank for carrying a current transformer for use in high voltage circuits.

Yet another object of this invention is to provide a novel conductor configuration for the primary winding of a high voltage current transformer.

These and other objects of this invention will become apparent from the following description when taken in connection with the drawings, in which:

FIGURE 1 is a plan view of the novel gas insulated current transformer of the invention schematically shown in connection with a high voltage interrupter.

FIGURE 2 is a partial cross-sectional view of the current transformer assemblage and support tank of FIGURE 1 showing the secondary winding in plan view.

FIGURE 3 is a cross-sectional view of FIGURE 2 taken across the lines 3—3 in FIGURE 2.

FIGURE 4 schematically illustrates a second embodiment of the coaxial conductor arrangement for defining a two-turn primary winding.

FIGURE 5 schematically illustrates the manner in which two turns are formed by the split coaxial conductor of FIGURE 4.

Referring first to FIGURE 1, and as schematically illustrated therein, a grounded tank 10 has a lead insulation bushing 11 extending from the top thereof which receives the insulated coaxial conductor 12 having a central conductor 13 and an outer conductor 14 which are insulated from one another by an insulation sheath 15 (FIGURE 2). An interrupter structure is then schematically illustrated by the pair of contacts 15a and 15 within the interrupter structure schematically illustrated by the dotted box 17 where the contact 15a is connected to a first terminal 18. Contact 16 is then connected to central conductor 13, while the outer conductor 14 is connected to the terminal 19.

The coaxial conductors 13 and 14 then form the primary winding for a current transformer contained within tank 10, as best shown in FIGURE 2. Referring now to FIGURE 2, we have illustrated therein the tank 10 as having an enclosed bottom surface and an upper open end which carries the external bolt ring 20 which can, for example, be welded to tank 10.

A metal cover 21 which has a suitable series of bolt holes therethrough is then bolted atop the flange or ring 20 by suitable bolts with a gasket 22 placed in an annular groove in ring 20 affording a gas-tight connection between metal plate 21 and ring 20.

It is to be noted that the upper end of bushing 11 is suitably sealed so that gas pressure within the interior of tank 10 will not leak through the end of bushing 11.

The current transformer contained within tank 10 is then constituted of one or more spirally wound cores of suitable transformer steel which have toroidally wound secondary windings uniformly distributed over the circumferences of the cores in the usual manner. FIGURES 2 and 3 illustrate a single transformer core 30 having a single winding thereon. The secondary winding is illustrated in FIGURE 2 in plan view, and is partially shown in FIGURE 3 as wound on the core in the normal fashion.

The leads 34 and 35 (FIGURE 3) are taken out of the secondary winding 36 and are then taken through the tank 10 in any desired manner as along the support rod 40 so that they can be connected to various externally disposed instrumentation.

The core and its toroidally wound secondary winding may then be independently supported within tank 10 as through the provision of support rods 40 through 43 which can, for example, be welded to the bottom of the tank at their bottom ends, and could, for example, fit into tapered grooves in cover plate 21 at their upper ends. The rods 40 through 43 are then secured directly to the exterior of the core and its toroidally wound secondary winding in any desired manner as through the use of insulation tape or the like. Note that there will be a gas filled space between the primary and secondary windings, as will be more fully understood from the following description.

The coaxially arranged conductors 13 and 14 are then brought through the lead bushing 11, and the outer conductor terminates immediately above the core and its toroidally wound secondary winding and is connected to rounded conductive segments 50 and 51. The conductive segments 50 and 51 are, in turn, connected to generally C-shaped conductive sections 52 and 53, respectively, which extend down to the bottom of the core. The central conductor 13 then extends directly through the center of the core and joins the ends of C-shaped conductors 52 and 53 as illustrated in FIGURE 2, with the various components being brazed together. A stand-off insulator 54 which is connected to the bottom of tank 10 then extends into conductor 13 in order to provide independent support for the primary winding defined by the C-shaped conductors 52 and 53 and the central conductor 13.

It is to be noted that all of the conductive material extending around the core have a rounded configuration and smooth surfaces with rounded edges, as shown in FIGURES 2 and 3 to minimize dielectric stresses between the winding and secondary windings.

FIGURE 2 further illustrates the placement of a capacitance potential divider which includes a thin conductive cylinder 60 disposed between the opening in cover 21 and the conductor 12. The shield 60 will acquire a potential at some intermediate value between the cover potential, which is ground, and the lead potential or line potential, depending upon its electrostatic coupling to the cover and to the lead which is, in turn, determined by the size and separation of the opposing surface areas. The shield 60 is suitably secured to the cover 21 in any suitable manner, as by the bolts 61 and 62.

If desired, a suitable differential protection transformer can be further added externally of the lead bushing 11 for operation in the usual manner.

As pointed out previously, the interior of tank 11 is then filled with a high dielectric gas, under pressure, such as sulphur hexafluoride, thereby permitting a reduction in the dimensions and clearances between the various structural components within tank 10.

The embodiment of FIGURES 1, 2 and 3 has illustrated the novel structure of the invention for a single-turn primary. FIGURES 4 and 5 schematically illustrate the manner in which conductor 12 can be modified to form a two-turn primary winding.

Thus, in FIGURE 4, the conductor 12 is illustrated in cross-section as having an elongated slot 70 which divides the conductor 13 into two sections 13a and 13b, and divides the conductor 14 into the two sections 14a and 14b.

FIGURE 5 illustrates the manner in which the conductive sections of FIGURE 4 can be associated with core 36 to define a two-turn conductor. Thus, section 14a passes around the outside of the core and is connected below the core to the end of section 13a to define a first primary turn for the current transformer. The upper end of section 13a is connected to the upper end of section 14b which extends downwardly and around the outer surface of the core 36. Section 14b is then connected at its bottom to section 13b, thereby defining a second primary turn with the section 13b forming the second terminal of the device. Clearly, any desired number of primary turns can be formed by this slotting method.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. In combination; a grounded sealed conductive housing; a lead bushing extending through said conductive housing; a coaxial conductor extending through said lead bushing; a current transformer within said grounded housing insulation support means connected between said grounded housing and said current transformer for supporting said current transformer within said grounded housing in insulated relation with respect to said grounded housing; said current transformer having a toroidal secondary winding and a primary winding wound on a magnetic core; said primary winding connected in series with said coaxial conductor; said housing filled with a high dielectric gas under pressure greater than atmospheric pressure; said coaxial conductor comprising inner and outer conductors insulated from one another; said inner conductor extending beyond the end of said outer conductor and through the center of said toroidal secondary winding; said end of said outer conductor adjacent the upper end surface of said toroidal winding; said primary winding including a pair of generally C-shaped conductors extending about the end surfaces and respective outer opposite side surfaces of said secondary winding and the said inner conductor; said pair of C-shaped conductors connected at their upper ends to said outer conductor adjacent said upper end surface of said toroidal winding; said pair of C-shaped conductors connected at their lower ends to said end of said inner conductor adjacent the lower end surface of said toroidal winding.

2. The device substantially as set forth in claim 1 wherein said insulation support means includes a standoff insulator connected between the bottom of said grounded housing and said end of said inner conductor.

References Cited by the Examiner
UNITED STATES PATENTS 1,957,982   5/1934   Smith _____ 174—18
2,605,376   7/1952   Schuttler _____ 336—223 X LEWIS H. MYERS, *Primary Examiner.*

T. J. KOZMA, *Assistant Examiner.*